(12) United States Patent
Ketchum et al.

(10) Patent No.: US 6,757,384 B1
(45) Date of Patent: Jun. 29, 2004

(54) ROBUST DOUBLE-TALK DETECTION AND RECOVERY IN A SYSTEM FOR ECHO CANCELATION

(75) Inventors: Richard Harry Ketchum, Naperville, IL (US); Anand Rangaswamy Setlur, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 549 days.

(21) Appl. No.: 09/723,572

(22) Filed: Nov. 28, 2000

(51) Int. Cl.[7] .............................................. H04M 9/08
(52) U.S. Cl. .......................... 379/406.01; 379/406.02; 379/406.03; 379/406.04; 379/406.06; 379/406.07; 379/406.09; 379/406.16
(58) Field of Search ...................... 379/406.01–406.16; 704/233, 270

(56) References Cited

U.S. PATENT DOCUMENTS

| | | | | |
|---|---|---|---|---|
| 4,894,820 A | * | 1/1990 | Miyamoto et al. | 379/406.01 |
| 5,796,820 A | * | 8/1998 | Sasada | 379/406.01 |
| 6,098,043 A | * | 8/2000 | Forest et al. | 704/270 |
| 6,198,819 B1 | * | 3/2001 | Farrell et al. | 379/406.01 |
| 6,434,110 B1 | * | 8/2002 | Hemkumar | 379/406.01 |
| 6,606,595 B1 | * | 8/2003 | Chengalvarayan et al. | 704/256 |

* cited by examiner

*Primary Examiner*—F. W. Isen
*Assistant Examiner*—Ramnandan Singh

(57) ABSTRACT

Echoes caused by discontinuities in a telecommunications transmission lines cause double talk which cause divergence problems with echo cancellers. Divergence problems in echo cancellers cause considerable problems in interactive caller response systems, they cause less problems if all parties to a call are human. One of the biggest problems is the effect of the echoes on automatic speech recognition systems. The echo canceller method and system presented cancels echoes to reduce their interference with ASR and yet provides stability in the presence of double talk.

11 Claims, 5 Drawing Sheets

ROBUST DOUBLE-TALK DETECTION AND RECOVERY IN A SYSTEM FOR ECHO CANCELATION

TECHNICAL FIELD

The invention relates to echo cancellation and more particularly to an echo cancellation method and apparatus with robust double talk detection and recovery for use with an automatic speech recognition (ASR) system.

BACKGROUND

In a pure digital communication network there is no echo. Invariably though in the network between an ASR and an end user, there are some digital-to-analog conversion points (also known as hybrids) that prevent the communication network from being purely digital, and these digital-to-analog conversion points are discontinuous and are sources for echoes. Echo cancellers are used to suppress such echoes, as described in U.S. Pat. No. 5,664,011 to Crochiere et al. But such echo cancellers have difficulty in the presence of double talk. Double talk occurs when electric signals corresponding to speech or talk are input to more than one station of a multiple station call. For example, double talk occurs if there are two parties to a call with each party located at a different end of a communication network and both parties talk at the same time. The difficulty with echo cancellers, such as those described in Crochiere et al., is that the coefficients of the adaptive filter used in the echo canceller tend to diverge rapidly in the presence of double talk, thereby causing distortion and introducing artifacts or producing spurious modulation frequencies. Such artifacts can negatively affect the intelligibility of the call, especially if one of the parties is an automatic speech recognition (ASR) system or similar system. If both parties are human, the typical response is to stop, wait for the double talk and divergence to end and then repeat unclear or garbled parts of the conversation.

Some attempts to prevent the difficulty of coefficient divergence consisted of freezing the value of the coefficients of the adaptive filter of the echo canceller when double talk is detected. One reason that does not solve the difficulty of diverging coefficients of the echo canceller adaptive filter is that detection of the start of double talk takes time and the deleterious divergence of the coefficients may already have taken place before the start of double talk is detected.

For an interactive ASR system, an audible system prompt is fed to the end-user and he or she, in turn, speaks back to the ASR system. The user input is corrupted with an additive echo which results from the reflection of the system prompt due to the presence of one or more hybrids in the network. These resulting echoes need to be cancelled prior to performing automatic speech recognition (ASR). Not doing echo cancellation prior to ASR would very likely result in the system prompt echo falsely triggering the recognition system. Doing classic echo canceling causes spurious artifacts which can and do cause speech recognition errors.

There is also a need in the echo cancellation art for non-diverging echo cancellers, especially for use with ASR systems.

Thus, there is a need in the art for an echo canceller that is adaptive yet well behaved in the presence of double talk.

SUMMARY OF THE INVENTION

Briefly stated, the aforementioned shortcomings of the echo canceling art are addressed and an advance in the art achieved by providing a robust method to detect and operate an echo canceling system in the presence of double talk. This robust method operates even under conditions when the strength of the echo of the audible sound at a first input is high and comparable in magnitude to a user's input speech at a second input.

In accordance with one embodiment of the invention, the aforementioned shortcomings are addressed and an advance in the art achieved by providing a system that guards against echo canceling adaptive filter coefficient divergence upon detection of double talk by substituting a previous set of coefficients from storage for a set of echo canceling adaptive filter coefficients that were adapted in the presence of double talk.

In accordance with another embodiment of the invention, the aforementioned shortcomings are addressed and an advance in the art achieved by providing a system that guards against coefficient divergence upon the earliest detection of double talk by substituting for an adapted set of echo canceling adaptive filter coefficients, a stable set of echo canceling adaptive filter coefficients that has provided a best Echo Return Loss Enhancement (ERLE).

DETAILED DESCRIPTION

Figure 1:
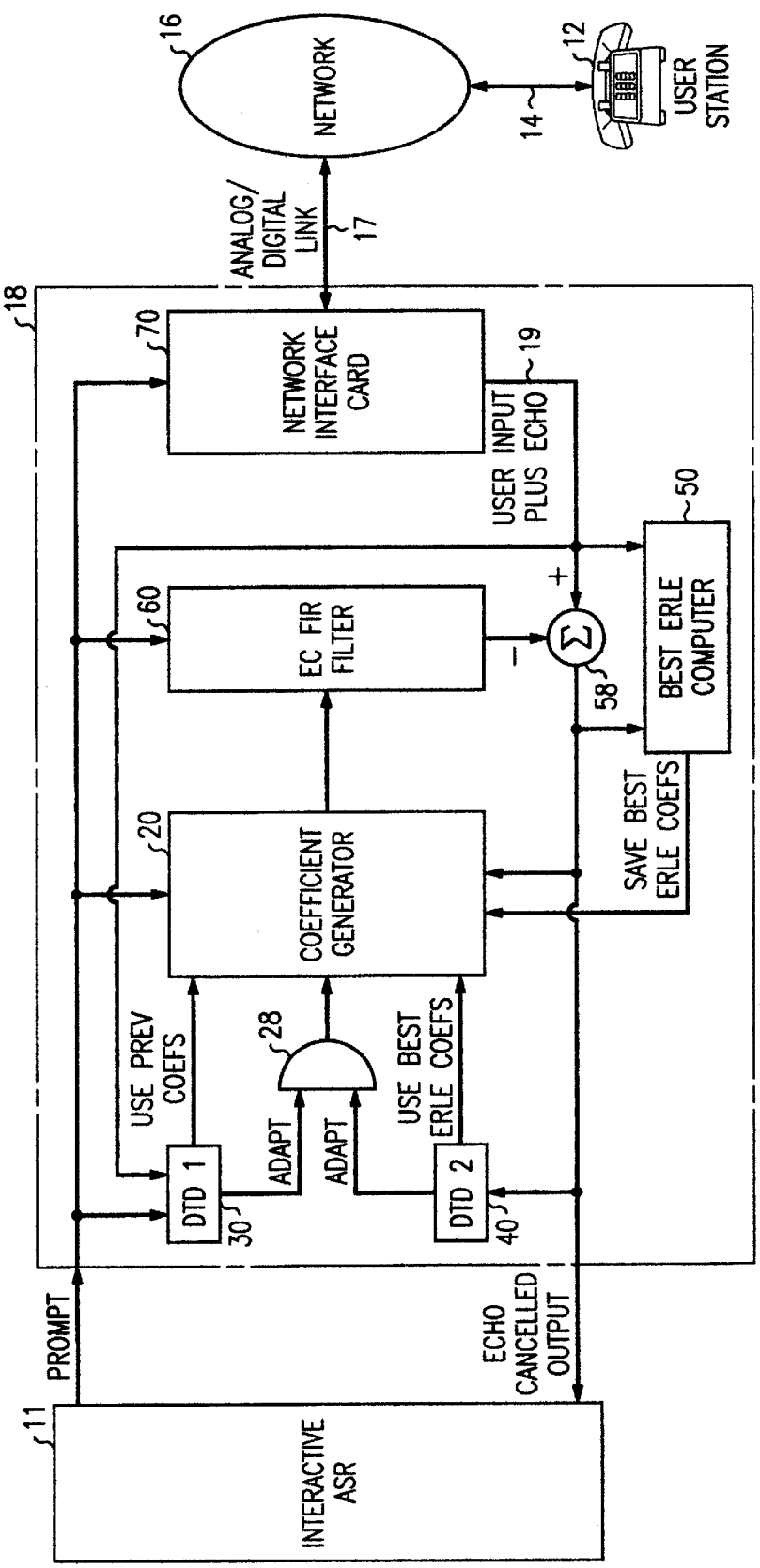
FIG. 1 is a block diagram of an arrangement for practicing the invention.

Referring now to FIG. 1, an end-to-end arrangement 10 involving an echo canceller is shown. Arrangement 10 has a remote user station 12 at a user end. Remote user station 12 typically is an analog telephone station connected by line 14, which typically is an analog line, to network 16. Quite often, network 16 is at least partially digital. If that is the case, somewhere in network 16 will be a hybrid connection which will be one source of echoes.

At the other end of arrangement 10 is a near end user station. In one embodiment of the present invention, the near end user station is an interactive ASR system 11. ASR system 11 is interactive in that upon answering a call, ASR system 11 sends back at least one audible sound as a prompt to a user at remote user station 12. The remote user is expected to make an audible response either during or after the prompt. Entertainment, and financial businesses are some of the common applications of interactive automated services built around or included within ASR system 11. In between the ASR system 11 and the network 16 are link 17, which may be analog or digital, and echo canceller 18. Echo canceler 18 has a prompt input that receives the interactive prompt signal from ASR system 11. This prompt input is connected to Coefficient Generator 20, first double talk detector (DTD1) 30, Echo Canceling FIR Filter 60, and network interface card 70 of echo canceller 18. Echo canceller 18 also has an echo cancelled output which is the output of an echo canceling summing point 58. The output of echo canceling summing point 58 is connected to a second double talk detector (DTD2) 40, a coefficient generator 20, and one input of a best-ERLE computer 50. The inputs of the echo canceling summing point 58 are the output of the echo canceling FIR filter 60, which is connected to an inverting input of the echo canceling summing point 58, and an output of the network interface card 70, which is connected to a non-inverted input of the echo canceling summing point 58.

The general theory of operation of echo canceler 18 is that the coefficient generator 20 adaptively generates coefficients which it passes to the EC FIR filter 60. The EC FIR filter uses these coefficients to filter the originally transmitted prompt and thereby simulates the echo of the prompt that is received on the user input line 19. If that simulation is perfect, then the output of the echo canceling summing point 58 will be zero. To the extent that the simulation is not perfect, the output of echo canceling summing point 58 will be non-zero. Such a non-zero signal is called the error signal using terminology of feedback and control theory branch of engineering.

In the case of a remote user at user station 12 speaking while the echo canceling of the prompt is in process, the user speech is not a part of the feedback-control loop, so coefficient generator 20 and EC FIR filter 60 cannot adapt to the user speech input. Attempts to adapt cause coefficient generator 20 to generate diverging coefficients. This is the reason that the double talk of the prompt and the user previously caused the problems of divergent coefficients and undesirable performance problems solved by the present invention. output of the network interface card 70 also is connected to another input of the best-ERLE computer 50. The output of the best-ERLE computer 50 is connected to an input of coefficient generator 20. The purpose of best-ERLE computer 50 will be explained below.

The coefficient generator 20 also has input connections to DTD1 30 and DTD2 40, as well as an input that is a logical product of outputs of DTD1 30 and DTD2 40.

The echo canceller 18 described in FIG. 1 is designed to be robust to divergence of the adaptive EC FIR filter coefficients due to double talk. As mentioned above, the echo canceller 18 has two different DTD modules 30, 40 to determine if double talk exists. Adaptation of the coefficients is stopped if either of the DTD modules 30, 40 detects double talk.

The echo canceller system 18 also continually keeps track of the ERLE on a block sample by block sample basis and stores a set of echo canceling FIR filter coefficients that correspond to a dynamically determined best-ERLE. At the slightest hint of coefficient divergence as detected by a criterion in module DTD2 40, the set of best-ERLE coefficients is substituted for the set of diverged coefficients in EC FIR filter 60 and operation continues with the best-ERLE set. With this double talk detection and remedy, the echo canceller 18 performs well, even in the difficult cases when an echo of the prompt is large relative to a spoken user input.

Individual components of the echo canceller system 18 depicted in FIG. 1 are discussed in detail below in relation to FIGS. 2–5.

Figure 2:
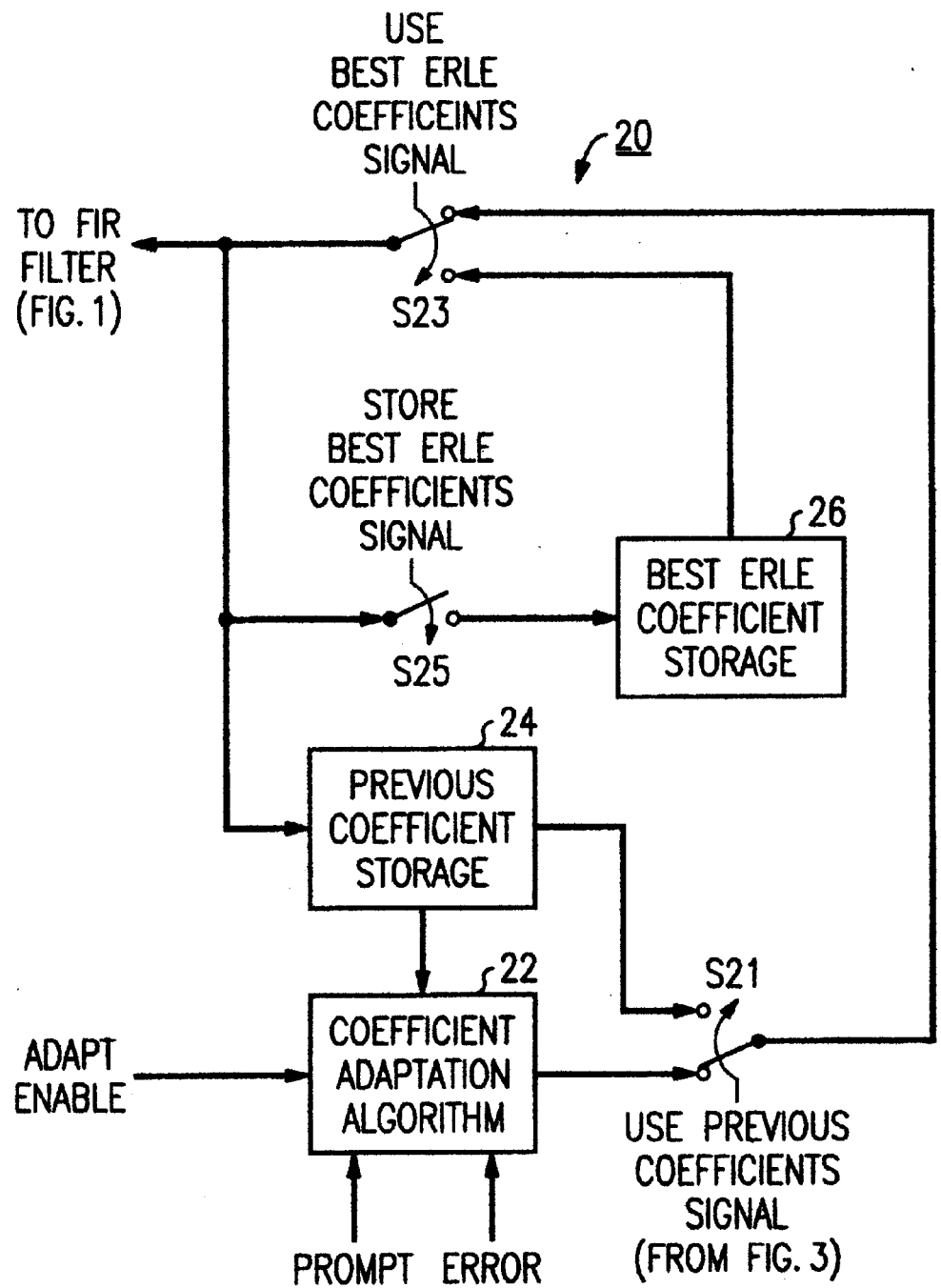
FIG. 2 is a block diagram of a coefficient generator as shown in FIG. 1.

Referring now to FIG. 2, coefficient generator 20 for generating coefficients used by the EC FIR filter 60 is shown. For each block of K samples (K=16 samples per block), the filter coefficients are updated using a normalized least mean square coefficient adaptation method (NLMS) by module 22. This well understood NLMS algorithm uses a "delay-line" full of prompt samples, the echo cancelled speech, (which is also referred to as the error signal), and the coefficients from the previous sample block adaptation which are stored in store 24. The coefficients are updated one sample at a time, but each update decision is made on a per sample block basis.

Figure 3:
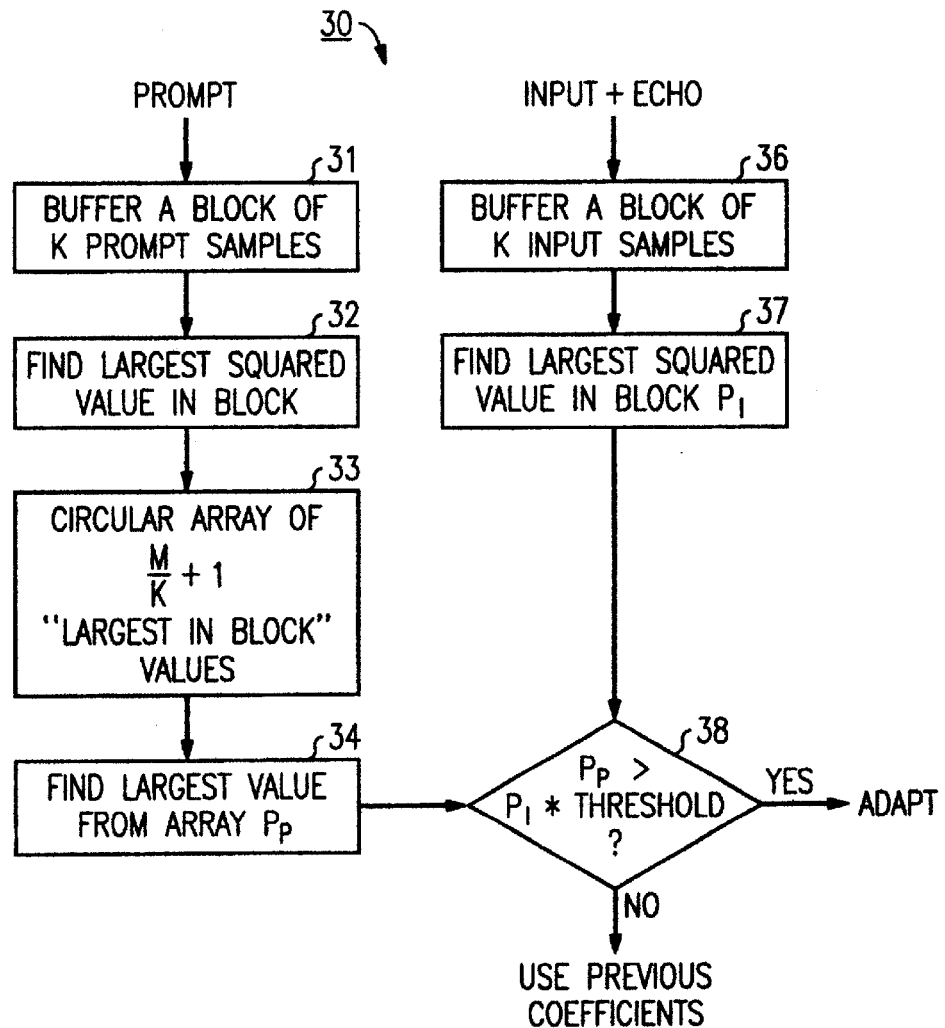
FIG. 3 is a block diagram of Double Talk Detector 1, shown in FIG. 1.
Figure 4:
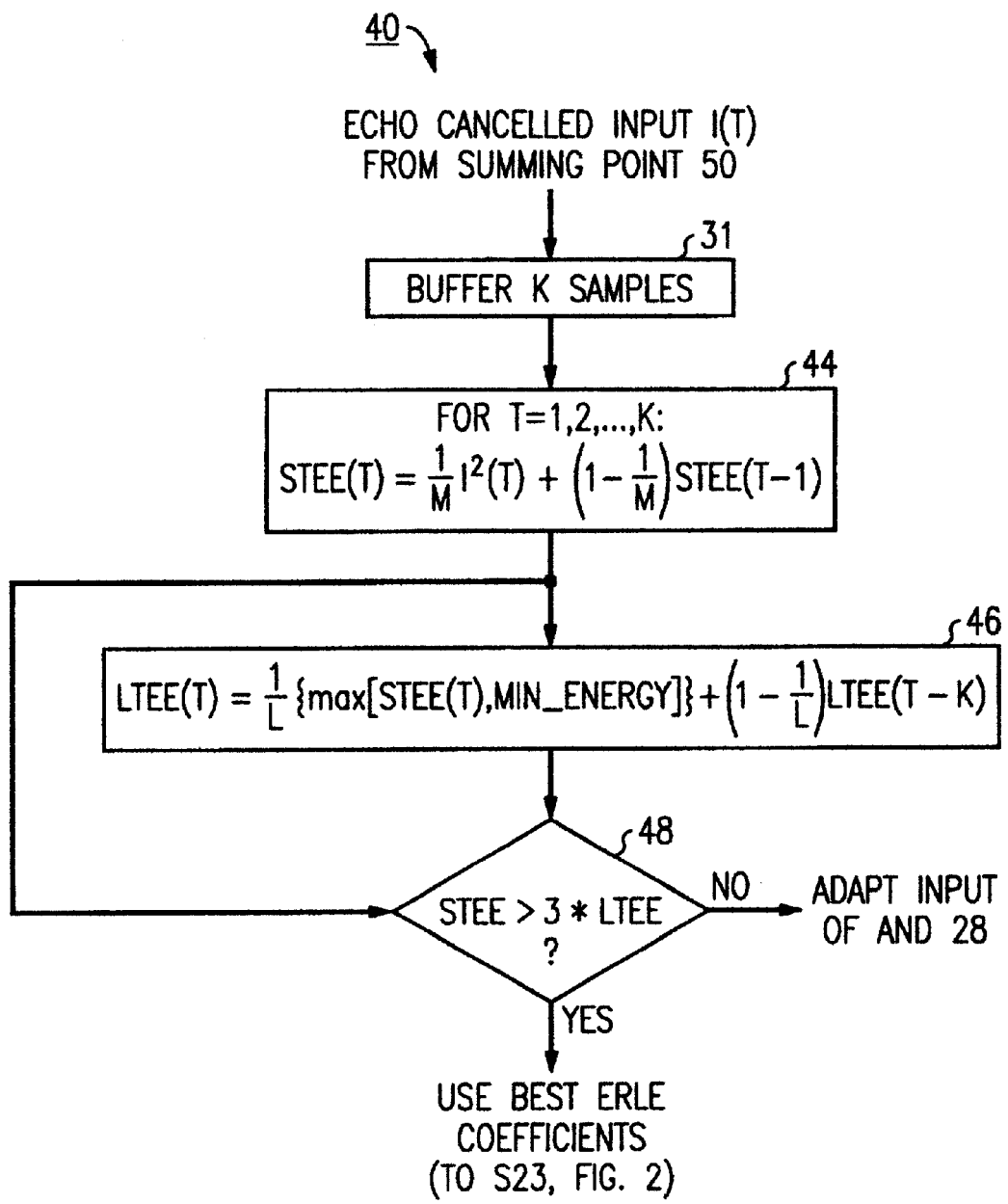
FIG. 4 is a block diagram of Double Talk Detector 2, shown in FIG. 1.

Adaptation does not take place if module DTD1 described in FIG. 3 or module DTD2 described in FIG. 4 detects double talk. In these instances filter coefficients adapted from a previous sample block and stored in store 24 or those associated with best_ERLE are stored in store 26 are used as a substitute set. In the case when the double talk detected signal is produced by module DTD1, the coefficients from the previous sample block are used in place of the presumptively diverged coefficients which would be generated in the current sample block. In the case of double talk being detected by module DTD2, the set of coefficients corresponding to the best ERLE determined up to this point by best_ERLE computer 58 are taken out of store 26 and substituted in place of the presumptively diverged coefficients. The reason for these substitutions from either store 24 or store 26 is to provide a better approximation of the optimal echo canceling coefficient set whenever double talk has been identified. This is desirable because double talk very often leads to divergent coefficients and undesirable operation. The substituted set of coefficients from either store 24 or store 26 also provides a better restart state once adaptation begins again.

Referring now to FIG. 3, a diagram of the modules of the DTD1 module 30 is illustrated. As shown in FIG. 3, a block of K samples from the prompt and a block of K samples from the input plus echo input, i.e. the pre-echo cancellation network input, are buffered by modules 31 and 36 respectively and then used to determine whether or not double talk occurs. DTD1 module 30 first calculates the square of each of the entries in the prompt block of K samples by part of module 32 and the input-plus-echo block of K samples by part of module 37. Next, the largest of these squared elements are determined separately for each block of K samples by modules 32 and 37, respectively. The largest squared element of the prompt block is stored at the end of an (M/K+1) long circular buffer 33 of similarly computed elements (where M is the length of the delay time of the path to echo source and back). This circular buffer 33 is subsequently searched by module 34 for the largest element therein. That largest element is then compared by comparator 38 to the largest squared entry from the input-plus-echo block of module 36 found by module 37. If the largest value from the circular buffer 33 is greater than the largest squared input-plus-echo times a specified threshold (preferably a threshold value of 1.0 is used), then a logic 1 "adapt" signal is sent to one input of AND gate 28, the output of which enables the coefficient generator 20. If this comparison fails, a "use previous coefficients" signal is sent to controlled switch S21. The process provided by module 30 is similar to the "Geigel algorithm" disclosed in U.S. Pat. No. 4,029,912 issued Jun. 14, 1977, but has minor differences necessitated by the block nature of the computation. DTD1 module 30 is used in conjunction with module DTD2 module 40 that will be described in FIG. 4. A joint adaptation decision from DTD1 module 30 and DTD2 module 40 by means of AND gate 28 is required in order to proceed with adaptation using the procedure described with regard to FIG. 2.

FIG. 4 is a diagram of the DTD2 module 40, which relies on comparative differences in short and long term error energy (STEE and LTEE respectively). The input to DTD2 module 40 is the echo cancelled input (also called the error signal) from echo canceling summing point 58. K samples of the echo cancelled input are buffered in store 42. For each of the K samples, the value of the echo cancelled input signal is squared and fed into the STEE calculator module 44. Both the STEE and the LTEE, as discussed below, compute the average energy over a given length of time. Both of these averages are computed using a "leaky integrator" which uses a first order difference equation of the form: $y(T)=G*x(T)+(1-G)*y(T-1)$. For the STEE calculator module 44, $x(T)$ equals the square of the input sample and the gain G takes the value of 1/M, where M is the length of the echo canceller delay line. This corresponds to calculating the average value over the last 20 milliseconds of input. For the LTEE calculator module 46, $x(T)$ depends on the strength of the STEE. If the STEE is greater than a specified threshold then $x(T)$ is the STEE value otherwise, $x(T)$ takes the specified threshold as its value. The specified threshold value used in one embodiment of the present invention system is 2500, which approximately corresponds to −50 dBm0. The value of G is 1/250 which, since it represents calculations every 2 milliseconds, corresponds to computing the LTEE over the last 500 milliseconds of input. Finally, the STEE is compared by module 48 to the LTEE. If the STEE is greater than some specified value (preferable 3.0) times the LTEE, the presence of double talk is declared. The "adapt signal" to AND gate 28 is set to logic zero and the "use best ERLE coefficients signal" to controlled switch S23 is set to one. This will result in the coefficient generator 20 of FIG. 2 outputting the EC best ERLE coefficients array 26. If the result of the compare is negative, then the adapt signal is set to logic one and the "use best ERLE coefficients signal" is set to logic zero. The effect on the coefficient generator 20 in that case, is that it will be controlled by the outputs of the DTD1 30 in FIG. 3.

Figure 5:
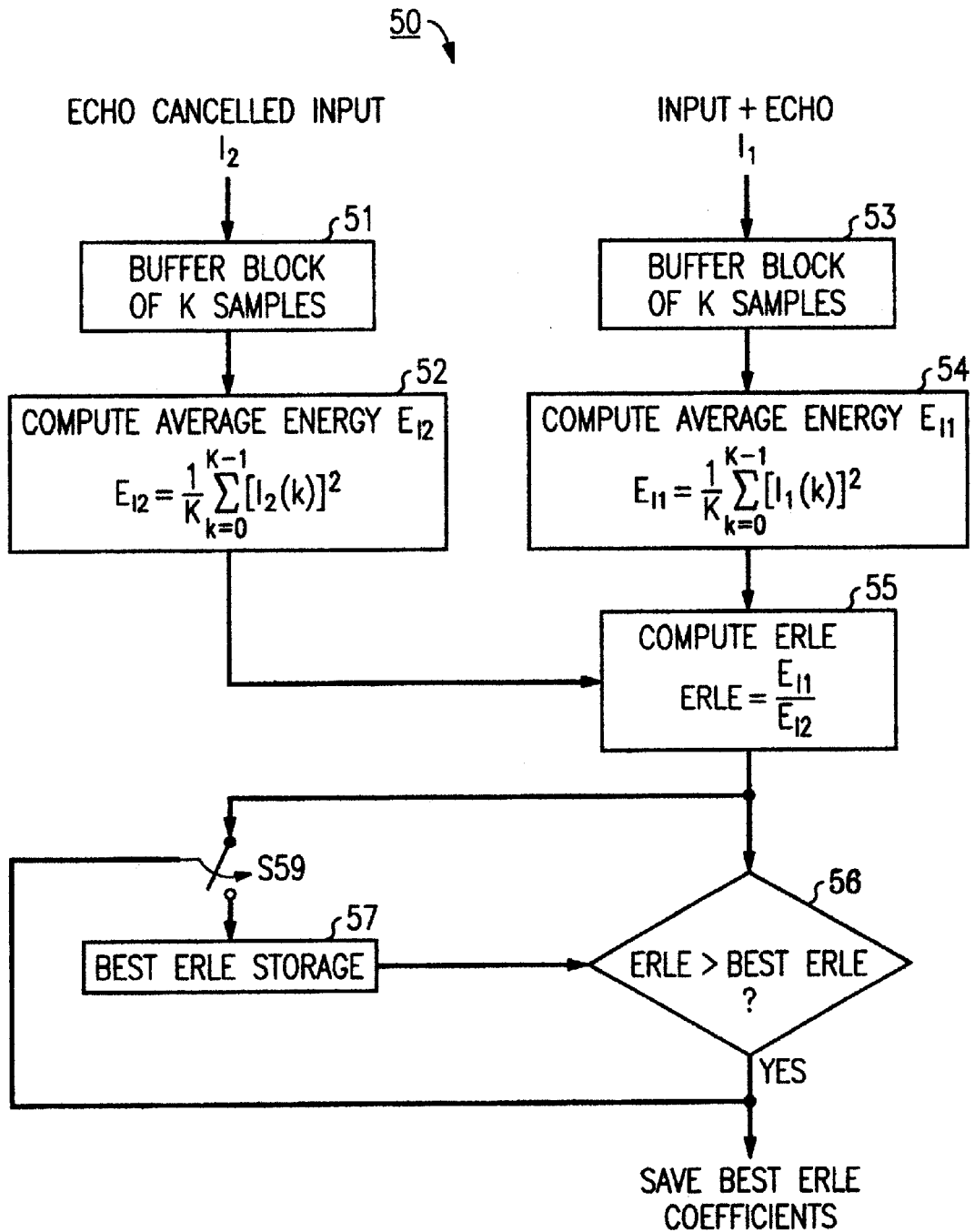
FIG. 5 is a diagram for computing best echo return loss enhancement (ERLE) and store best ERLE coefficients.

FIG. 5 illustrates bestEcho Return Loss Enhancement (ERLE) computer module 50 that is used to compute the ERLE, determine which ERLE is the best ERLE thus far in the call, store the best ERLE in a local variable storage and then to send a signal to the coefficient generator 20 instructing it to save the present set of coefficients in the best ERLE coefficients buffer 26. The best ERLE computer 50 operates on blocks of K samples of the echo cancelled input $I_2$ and corresponding blocks of K samples of input plus echo $I_1$ (K equals 16 in the current implementation, but could have other values such as 20, 32, 64 etc.). After buffering the data in storage modules 51 and 52 respectively, the average energy of each of the two signals is calculated by summing the squares of the particular samples and dividing each sum by K in modules 52 and 54 respectively. The average energy of the input-plus-echo samples is then divided by the average energy of the echo-cancelled samples to compute ERLE module 55. This computation yields an ERLE, which is subsequently compared with the current value stored in the best_ERLE variable storage 57. If the ERLE just computed is greater than the contents of best ERLE variable storage 57, then controlled switch S59 is closed, the ERLE just computed is copied to the best_ERLE variable storage 57 and the save-the-best-erle-coefficients signal is sent to the coefficient generator 20 (specifically to S25 and module 26). If the ERLE is less than or equal to the contents of best_ERLE, then no action is taken.

Reflecting back to FIG. 1, network interface card 70 interfaces Echo canceler 18 with the network 16. Interface card 70 is shown as part of echo canceller 18, but it could easily be moved out as a separate unit that connects between the echo canceller and the network, or interface card 70 could be located in the network 16. is worth noting that if line 17 is analog, then interface card 70 must have a hybrid of some kind to change the signals of ASR system 11 to an analog line. If line 17 is digital, such as ISDN, then the interface card 70 is all digital matching circuits and the hybrid that causes the echoes are only in network 16 somewhere. In operation with an ASR system 11, network 16, line 14, remote user station 12, and echo canceller 18, the system prompt is fed to the end-user and he or she, in turn, speaks back to the automatic speech recognition (ASR) system 11. The remote user input is corrupted with an additive echo that results from the reflection of the system prompt due to the presence of one or more hybrids in network 16 and/or interface card 70. The resulting echo needs to be cancelled prior to performing automatic speech recognition (ASR). Not doing-echo cancellation prior to ASR often results in the system prompt echo falsely triggering the recognition system.

The amount of echo and delay present depends on several factors, not all of which are quantifiable and which vary from call to call. The echo canceller 18 models this problem as an adaptive system. It takes the system prompt and the echo corrupted user speech as input, and adaptively generates coefficients for the finite impulse response (FIR) filter 60 which is subsequently used to remove as much of the echo as possible. The canceller 18 does this by continually refining its estimate of the filter coefficients based on the difference of the filtered prompt and the incoming signal. The resultant echo cancelled speech output from this adaptive time varying echo canceller 18 is then fed as input to the ASR system 11 for further processing.

A commonly used measure to assess echo canceller performance is the Echo Return Loss Enhancement (ERLE). It is a measure of the amount of additional attenuation of the prompt reflection (echo) provided by the canceller 18. Typical values for ERLEs range from 25 to 35 dB on human speech. The attenuation is even higher when the prompt comprises uncorrelated white noise.

A necessary component of any robust echo canceller is the quality of its double talk detection(DTD) modules. Double talk, as mentioned previously, is the situation that arises when both the system prompt and the end user speech are active at the same instant. For good echo cancellation, the echo canceller 18 needs to adapt its coefficients only when the system prompt is active and there is no input from the remote-end. The echo canceller 18 can diverge rapidly if it tries to adapt its coefficients in the presence of remote-end speech. Recognition performance can be adversely affected due to echo canceller coefficients diverging. Especially when the acoustic level of the prompt echo is of the same level or higher than a user's spoken input.

Thus, it will now be understood that there has been disclosed a new method and apparatus for providing robust echo cancellation. While the invention has been particularly illustrated and described with reference to preferred embodiments thereof, it will be understood by those skilled in the art that various changes in form, details, and applications may be made therein. For example, the modules and sub modules of the echo canceler may be realized with hardware modules or with software modules running on a fast processor and supported by hardware and software interfaces to the ASR and the network. It is accordingly intended that the appended claims shall cover all such changes in form, details and applications which do not depart from the true spirit and scope of the invention.

What is claimed is:

1. An echo cancellation method for use between at least two ends of a communication path having at least one audible sound sent from a first station at a first end of a communication path to a user at a second end of said communication path comprising the steps of:

receiving said audible sound from said first station at a first input of an echo canceller;

receiving an echo of said audible sound from a mismatch located between said echo canceller and said second end of said communication path;

adapting a first set of coefficients of a digital filter to reduce a magnitude of said echo of said audible sound;

storing said first set of coefficients;

detecting a first double talk condition of a user speaking at the second end of said communication path at the same time that the audible sound is being received, said first double talk condition based on a comparison of the magnitude of said audible sound and the magnitude of a return signal comprising said echo and user speech from the second end of the communication path;

detecting a second double talk condition of a user speaking at the second end of said communication path at the same time that the audible sound is being received, the second double talk condition based on a comparison of an echo cancelled signal having a first time constant and the echo cancelled signal having a second time constant longer than said first time constant, adapting another set of coefficients of said filter to reduce a magnitude of said audible sound echo if neither of said first and second double talk conditions are detected; and in response to the detecting of one of said first and second double talk conditions, stopping any adapting of any set of coefficients of said filter and substituting one of a first and second set of coefficients to operate said filter to reduce the echo of said audible sound, said first and second sets of coefficients corresponding to said first and second double talk conditions, respectively.

2. The method of claim 1, wherein said detecting the first double talk condition step detects the first double talk condition if the magnitude of said echo of said audible sound is greater than a threshold value based on said user speech.

3. The method of claim 1, wherein said detecting the second double talk condition step detects the second double talk condition if a short term error energy is greater than a threshold value based on a long term error energy.

4. The method of claim 3, wherein the short term error energy must be greater than three times the long term error energy.

5. The method of claim 3, wherein said seconds set of coefficients is a best echo return loss enhancement set.

6. An echo cancellation method for an automatic speech recognition system having at least one prompt sent from the ASR system at a first end of a network to a user at a second end of said network comprising the steps of:

receiving the prompt from said ASR system at a first input of an echo canceller;

receiving an echo of said prompt from a mismatch located between said echo canceller and said second end of said network;

adapting a first set of coefficients of a digital filter to reduce a magnitude of said echo of said prompt;

storing said first set of coefficients;

detecting a first double talk condition of a user speaking at the second end of said communication path at the same time that the prompt is being received, said first double talk condition based on a comparison of the magnitude of said prompt and the magnitude of a return signal comprising said echo and user speech from the second end of the communication path;

detecting a second double talk condition of a user speaking at the second end of said communication path at the same time that the prompt is being received, the second double talk condition based on a comparison of an echo cancelled signal having a first time constant and the echo cancelled signal having a second time constant longer than said first time constant;

adapting another set of coefficients of said filter to reduce a magnitude of said prompt echo if neither of said first and second double talk conditions are detected; and in response to the detecting of one of said first and second double talk conditions, stopping any adapting of any set of coefficients of said filter and substituting one of a first and second set of coefficients to operate said filter to reduce the echo of the prompt, said first and second sets of coefficients corresponding to said first and second double talk conditions, respectively.

7. The method of claim 6, wherein said detecting the first double talk condition step detects the first double talk condition if said echo of said prompt is greater than a threshold value based on said user speech.

8. The method of claim 6, wherein said detecting the second double talk condition step detects the second double talk condition if a short term error energy is greater than a threshold value based on a long term error energy.

9. The method of claim 6, wherein the short term error energy must be greater than three times the long term error energy.

10. The method of claim 6, wherein said seconds set of coefficients is a best echo return loss enhancement set.

11. An echo canceller for use with an automatic speech recognition system, an echo causing network and a remote user at a remote user station, comprising:

means for receiving the prompt from said ASR system at a first input of an echo canceller;

means for receiving an echo of said prompt from a mismatch located between said echo canceller and said second end of said network;

means for adapting a first set of coefficients of a digital filter to reduce a magnitude of said echo of said prompt;

a memory for storing said first set of coefficients;

means for detecting a first double talk condition of a user speaking at the second end of said communication path at the same time that the prompt is being received, said first double talk condition based on a comparison of the magnitude of said prompt and the magnitude of a return signal comprising said echo and user speech from the second end of the communication path;

means for detecting a second double talk condition of a user speaking at the second end of said communication path at the same time that the prompt is being received, the second double talk condition based on a comparison of an echo cancelled signal having a first time constant and the echo cancelled signal having a second time constant longer than said first time constant;

means for adapting another set of coefficients of said finite impulse response filter to reduce a magnitude of said prompt echo if neither of said first and second double talk conditions are detected; and responsive to the means for detecting said first and second double talk conditions, means for stopping any adapting of any set of coefficients of said filter and means for substituting one of a first and second set of coefficients to operate said filter to reduce the echo of the prompt, said first and second sets of coefficients corresponding to said first and second double talk conditions, respectively.

* * * * *